US012769626B2

(12) United States Patent
Ati et al.

(10) Patent No.: US 12,769,626 B2
(45) Date of Patent: Oct. 20, 2026

(54) PROVIDING ADAPTIVE AND DYNAMIC REDUNDANCY FOR FUNCTIONAL SAFETY IN PROCESSOR DEVICES

(71) Applicant: QUALCOMM Incorporated, San Diego, CA (US)

(72) Inventors: Vasista Ati, Bangalore (IN); Vardhana Mruthyunjaya, Mangalore (IN); Kota Subba Rao Sajja, Bengaluru (IN); Ashish Mishra, Bhubaneswar (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/898,927

(22) Filed: Sep. 27, 2024

(65) Prior Publication Data

US 2026/0093584 A1 Apr. 2, 2026

(51) Int. Cl.
*G06F 11/16* (2006.01)
*G06F 11/20* (2006.01)

(52) U.S. Cl.
CPC ...... *G06F 11/1658* (2013.01); *G06F 11/1641* (2013.01); *G06F 11/165* (2013.01);
(Continued)

(58) Field of Classification Search
CPC .... G06F 11/1629–1658; G06F 11/1675–1691; G06F 11/2025;
(Continued)

(56) References Cited

U.S. PATENT DOCUMENTS 7,743,285 B1 * 6/2010 Aggarwal ............. G06F 11/181 714/43
2002/0157071 A1 10/2002 Schiefele et al.
(Continued)

OTHER PUBLICATIONS

International Search Report and Written Opinion for International Patent Application No. PCT/US2025/043877, mailed Nov. 19, 2025, 12 pages.

*Primary Examiner* — Marc Duncan
*Assistant Examiner* — Albert Li
(74) *Attorney, Agent, or Firm* — Withrow & Terranova, PLLC

(57) ABSTRACT

Providing adaptive and dynamic redundancy for functional safety in processor devices is disclosed herein. In some aspects, a processor device comprises a central configurable redundancy logic block (CRLB) controller circuit, a redundancy map matrix switch circuit, a plurality of safety-critical block circuits, and a plurality of CRLB clusters. The central CRLB controller circuit receives redundancy mapping data for each safety-critical block circuit, and receives an indication of one or more active block circuits among the safety-critical block circuits. The central CRLB controller circuit transmits the redundancy mapping data corresponding to the active block circuits to the redundancy map matrix switch circuit, which configures one or more CRLB clusters to duplicate functionality of the respective active block circuits based on the redundancy mapping data. The redundancy map matrix switch circuit then provides logic redundancy for the one or more active block circuits using the one or more CRLB clusters.

20 Claims, 5 Drawing Sheets

(52) U.S. Cl.
CPC ...... *G06F 11/2025* (2013.01); *G06F 11/2028* (2013.01); *G06F 11/2035* (2013.01); *G06F 2201/85* (2013.01)

(58) Field of Classification Search
CPC ............. G06F 11/2028; G06F 11/0796; G06F 11/2038; G06F 11/2041; G06F 11/2097; B60W 50/02; B60W 50/0205; B60W 50/0225; B60W 50/023; B60W 2050/021
See application file for complete search history.

(56) References Cited

U.S. PATENT DOCUMENTS

| | | | | |
|---|---|---|---|---|
| 2007/0118783 | A1* | 5/2007 | Reblewski | G06F 11/27 714/E11.169 |
| 2009/0217092 | A1* | 8/2009 | Weiberle | G06F 11/1654 714/24 |
| 2012/0131288 | A1* | 5/2012 | Box | G06F 12/0646 711/E12.001 |
| 2012/0210162 | A1* | 8/2012 | Gara | G06F 11/1641 714/E11.02 |
| 2019/0049912 | A1* | 2/2019 | Poornachandran | G06F 30/343 |
| 2021/0300425 | A1* | 9/2021 | Hyde | G06N 3/045 |
| 2022/0180959 | A1* | 6/2022 | Borgonovo | G11C 29/12015 |

* cited by examiner

PROVIDING ADAPTIVE AND DYNAMIC REDUNDANCY FOR FUNCTIONAL SAFETY IN PROCESSOR DEVICES

TECHNICAL FIELD

The technology of the disclosure relates generally to implementing functional safety and redundancy mechanisms in processor devices, and, in particular, to providing more effective Automotive Safety Integrity Level (ASIL)-compliant safety and redundancy mechanisms.

BACKGROUND

The International Organization for Standardization (ISO) in 2011 defined an international standard known as ISO 26262 for functional safety of electrical and/or electronic systems installed in vehicles. Included in the ISO 26262 standard are the ASIL (Automotive Safety Integrity Level) standards, which define the functional safety requirements for automotive systems. The ASIL standards categorize such automotive systems based on the level of risk they pose to passengers and pedestrians, with the risk categories ranging from ASIL A (lowest risk) to ASIL D (highest risk). The ASIL standards are intended to ensure that critical automotive systems, such as braking, steering, and airbag control, perform reliably even under failure conditions.

Compliance with the ASIL standards involves implementing safety mechanisms and redundancy strategies to detect and mitigate faults. These safety and redundancy mechanisms involve, for example, dual-core lockstep techniques, triple module redundancy techniques, and end-to-end monitoring (E2M) techniques. Dual-core lockstep is a fault-tolerance technique whereby two (2) processor cores execute the same instructions to process the same data in parallel. The generated outputs of both processor cores are then compared in real time, and, if a discrepancy between the outputs is detected, the system can raise a fault and/or trigger a safety response. Triple module redundancy techniques provide additional redundancy by adding a third processing unit to the system. The three (3) processors perform the same task in parallel, and a majority voting system determines the correct result. If one (1) of the three (3) processor fails or produces incorrect output, the other two (2) will outvote it, ensuring that the system continues to function correctly. Finally, E2M safety mechanisms ensure that data transmitted between components is monitored from its source to its destination to verify data integrity and check for corruption.

However, the above-noted safety and redundancy schemes may suffer from disadvantages. Techniques like dual core lockstep and triple module redundancy may not be able to be implemented for all safety-critical logic circuits due to the excessive processor area required. While E2M safety mechanisms may be used to supplement dual core lockstep and triple module redundancy to achieve ASIL-compliant fault diagnostic coverage, such E2M safety mechanisms may be time-consuming, may not be continuously active, and/or may incur additional software processing overhead. Consequently, E2M safety mechanisms may not be able to raise a functional safety error or warning in a timely fashion.

SUMMARY OF THE DISCLOSURE

Aspects disclosed in the detailed description include providing adaptive and dynamic redundancy for functional safety in processor devices. Related apparatus, methods, and computer-readable media are also disclosed. In this regard, in some exemplary aspects disclosed herein, a processor device comprises a plurality of safety-critical block circuits, and a plurality of configurable redundancy logic block (CRLB) clusters that each comprise a plurality of CRLB circuits. As used herein, a "CRLB circuit" comprises a circuit that can be configured to mimic the functionality of a primitive gate and/or a primitive flipflop, and that can be configurably interconnected with other CRLB circuits to form a CRLB cluster. The processor device also comprises a central CRLB controller circuit, and a redundancy map matrix switch circuit that is communicatively coupled to the safety-critical block circuits, the CRLB clusters, and the central CRLB controller circuit.

In exemplary operation, the central CRLB controller circuit receives redundancy mapping data for each safety-critical block circuit of the processor device (e.g., as part of a trusted module engine (TME) secure boot process). The central CRLB controller circuit subsequently receives an indication of one or more active block circuits among the plurality of safety-critical block circuits. The central CRLB controller circuit transmits the redundancy mapping data corresponding to the one or more active block circuits to the redundancy map matrix switch circuit of the processor device. The redundancy map matrix switch circuit then configures one or more of the CRLB clusters of the processor device to duplicate functionality of the respective one or more active block circuits, based on the redundancy mapping data.

The redundancy map matrix switch circuit then provides logic redundancy for the one or more active block circuits using the one or more CRLB clusters. In some aspects, the redundancy map matrix switch circuit is configured to provide logic redundancy by comparing a first output of an active block circuit of the one or more active block circuits with a second output of a corresponding CRLB cluster of the one or more CRLB clusters. If the first output does not match the second output, the redundancy map matrix switch circuit transmits a fault indication for the active block circuit to a safety manager circuit of the processor device. The redundancy map matrix switch circuit according to some aspects may also perform fault correction by using the functionality of the CRLB cluster in place of the active block circuit (e.g., by routing input directed to the active block circuit to the CRLB cluster, and routing output from the CRLB cluster as if it originated from the active block circuit).

Some aspects may provide that the central CRLB controller circuit, upon receiving the redundancy mapping data, may store the redundancy mapping data in a CRLB cluster RAM device of the processor device. According to some aspects, the safety manager circuit of the processor device may determine a current use case of the processor device (e.g., in response to the safety manager circuit detecting a change from a prior use case of the processor device). The safety manager circuit then identifies the one or more active block circuits among the plurality of safety-critical block circuits based on the current use case, and transmits the indication of the one or more active block circuits to the central CRLB controller circuit.

In another aspect, a processor device is disclosed. The processor device comprises a plurality of safety-critical block circuits, and a plurality of CRLB clusters, each comprising a plurality of CRLB circuits. The processor device further comprises a central CRLB controller circuit, along with a redundancy map matrix switch circuit that is communicatively coupled to the plurality of safety-critical block circuits, the plurality of CRLB clusters, and the central CRLB controller circuit. The central CRLB controller circuit is configured to receive redundancy mapping data for each safety-critical block circuit of the plurality of safety-critical block circuits. The central CRLB controller circuit is further configured to receive an indication of one or more active block circuits among the plurality of safety-critical block circuits. The central CRLB controller circuit is also configured to transmit the redundancy mapping data corresponding to the one or more active block circuits to the redundancy map matrix switch circuit. The redundancy map matrix switch circuit is configured to configure one or more CRLB clusters of the plurality of CRLB clusters to duplicate functionality of the respective one or more active block circuits, based on the redundancy mapping data. The redundancy map matrix switch circuit is further configured to provide logic redundancy for the one or more active block circuits using the one or more CRLB clusters.

In another aspect, a processor device is disclosed. The processor device comprises means for receiving redundancy mapping data for each safety-critical block circuit of a plurality of safety-critical block circuits of the processor device. The processor device further comprises means for receiving an indication of one or more active block circuits among the plurality of safety-critical block circuits. The processor device also comprises means for configuring one or more CRLB clusters of a plurality of CRLB clusters to duplicate functionality of the respective one or more active block circuits, based on the redundancy mapping data corresponding to the one or more active block circuits. The processor device additionally comprises means for executing the one or more active block circuits with the one or more CRLB clusters as redundancy.

In another aspect, a method for providing adaptive and dynamic redundancy for functional safety in processor devices is disclosed. The method comprises receiving, by a central CRLB controller circuit of a processor device, redundancy mapping data for each safety-critical block circuit of a plurality of safety-critical block circuits of the processor device. The method further comprises receiving, by the central CRLB controller circuit, an indication of one or more active block circuits among the plurality of safety-critical block circuits. The method also comprises transmitting, by the central CRLB controller circuit, the redundancy mapping data corresponding to the one or more active block circuits to a redundancy map matrix switch circuit of the processor device. The method additionally comprises configuring, by the redundancy map matrix switch circuit, one or more CRLB clusters of a plurality of CRLB clusters of the processor device to duplicate functionality of the respective one or more active block circuits, based on the redundancy mapping data. The method further comprises providing, by the redundancy map matrix switch circuit, logic redundancy for the one or more active block circuits using the one or more CRLB clusters.

In another aspect, a non-transitory computer-readable medium is disclosed. The non-transitory computer-readable medium stores computer-executable instructions that, when executed, cause a processor device to receive redundancy mapping data for each safety-critical block circuit of a plurality of safety-critical block circuits of the processor device. The computer-executable instructions further cause the processor device to receive an indication of one or more active block circuits among the plurality of safety-critical block circuits. The computer-executable instructions also cause the processor device to transmit the redundancy mapping data corresponding to the one or more active block circuits to a redundancy map matrix switch circuit of the processor device. The computer-executable instructions additionally cause the processor device to configure one or more CRLB clusters of a plurality of CRLB clusters of the processor device to duplicate functionality of the respective one or more active block circuits, based on the redundancy mapping data. The computer-executable instructions further cause the processor device to provide logic redundancy for the one or more active block circuits using the one or more CRLB clusters.

DETAILED DESCRIPTION

Figure 1:
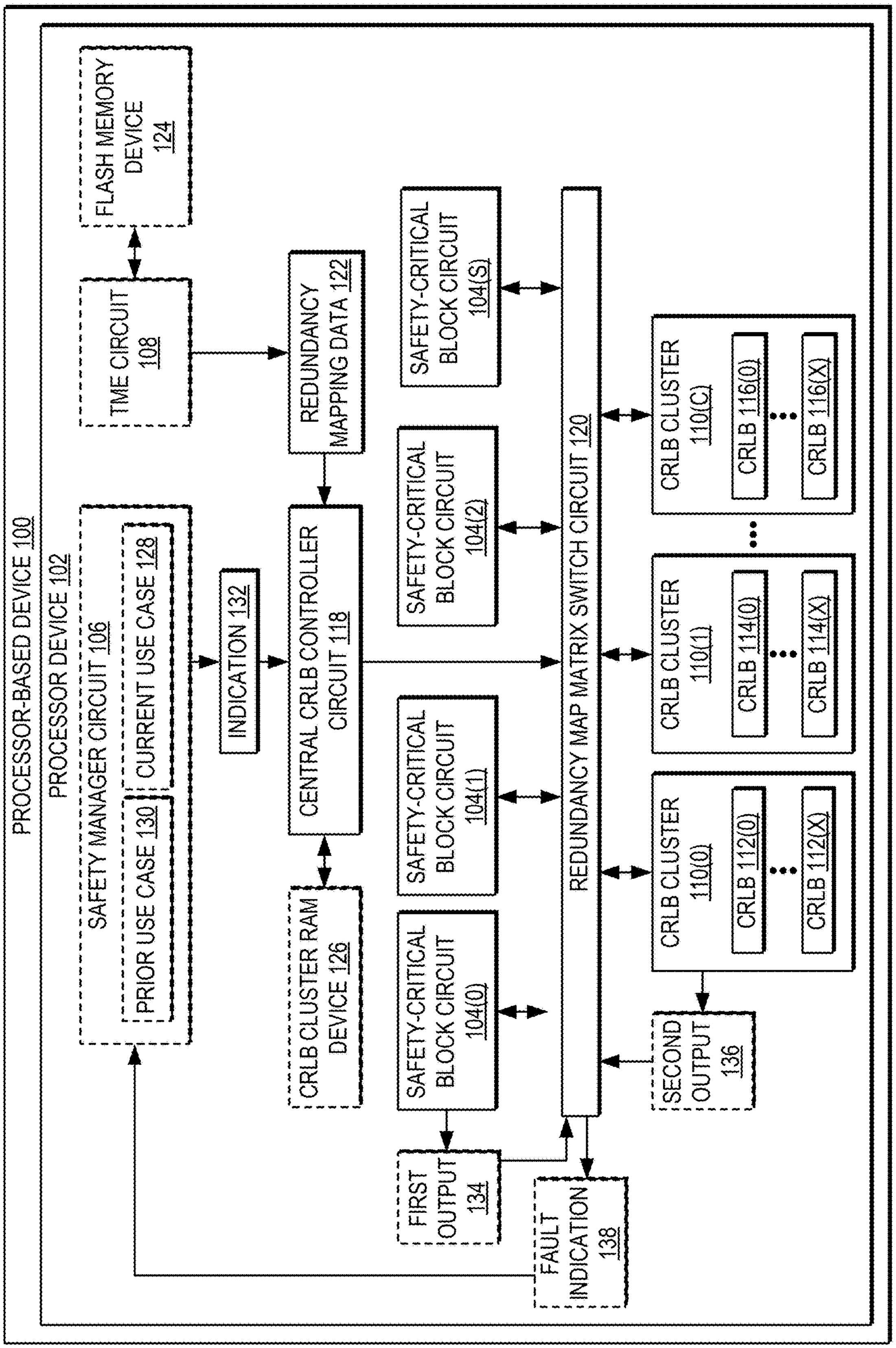
FIG. 1 is a diagram of an exemplary processor-based system that includes a processor device comprising a plurality of central configurable redundancy logic block (CRLB) clusters, a CRLB controller circuit, and a redundancy map matrix switch circuit to provide adaptive and dynamic redundancy for functional safety, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise expressly indicated.

Aspects disclosed in the detailed description include providing adaptive and dynamic redundancy for functional safety in processor devices. Related apparatus, methods, and computer-readable media are also disclosed. In this regard, in some exemplary aspects disclosed herein, a processor device comprises a plurality of safety-critical block circuits, and a plurality of configurable redundancy logic block (CRLB) clusters that each comprise a plurality of CRLB circuits. As used herein, a "CRLB circuit" comprises a circuit that can be configured to mimic the functionality of a primitive gate and/or a primitive flipflop, and that can be configurably interconnected with other CRLB circuits to form a CRLB cluster. The processor device also comprises a central CRLB controller circuit, and a redundancy map matrix switch circuit that is communicatively coupled to the safety-critical block circuits, the CRLB clusters, and the central CRLB controller circuit.

In exemplary operation, the central CRLB controller circuit receives redundancy mapping data for each safety-critical block circuit of the processor device (e.g., as part of a trusted module engine (TME) secure boot process). The central CRLB controller circuit subsequently receives an indication of one or more active block circuits among the plurality of safety-critical block circuits. The central CRLB controller circuit transmits the redundancy mapping data corresponding to the one or more active block circuits to the redundancy map matrix switch circuit of the processor device. The redundancy map matrix switch circuit then configures one or more of the CRLB clusters of the processor device to duplicate functionality of the respective one or more active block circuits, based on the redundancy mapping data.

The redundancy map matrix switch circuit then provides logic redundancy for the one or more active block circuits using the one or more CRLB clusters. In some aspects, the redundancy map matrix switch circuit is configured to provide logic redundancy by comparing a first output of an active block circuit of the one or more active block circuits with a second output of a corresponding CRLB cluster of the one or more CRLB clusters. If the first output does not match the second output, the redundancy map matrix switch circuit transmits a fault indication for the active block circuit to a safety manager circuit of the processor device. The redundancy map matrix switch circuit according to some aspects may also perform fault correction by using the functionality of the CRLB cluster in place of the active block circuit (e.g., by routing input directed to the active block circuit to the CRLB cluster, and routing output from the CRLB cluster as if it originated from the active block circuit).

Some aspects may provide that the central CRLB controller circuit, upon receiving the redundancy mapping data, may store the redundancy mapping data in a CRLB cluster RAM device of the processor device. According to some aspects, the safety manager circuit of the processor device may determine a current use case of the processor device (e.g., in response to the safety manager circuit detecting a change from a prior use case of the processor device). The safety manager circuit then identifies the one or more active block circuits among the plurality of safety-critical block circuits based on the current use case, and transmits the indication of the one or more active block circuits to the central CRLB controller circuit.

In this regard, FIG. 1 is a diagram of an exemplary processor-based device 100 that includes a processor device 102. The processor-based device 100 may comprise, as a non-limiting example, a System-on-Chip (SoC). The processor device 102, which also may be referred to as a "processor core" or a "central processing unit (CPU) core," may be an in-order or an out-of-order processor (OoP), and/or may be one of a plurality of processor devices 102 provided by the processor-based device 100.

The processor device 102 in the example of FIG. 1 implements functionality that is subject to the Automotive Safety Integrity Level (ASIL) standards specified by the International Organization for Standardization (ISO) 26262 standard. In this regard, the processor device 102 comprises a plurality of safety-critical block circuits 104(0)-104(S). Each of the safety-critical block circuits 104(0)-104(S) is a hardware element of the processor device 102 that is configured to provide functionality that is deemed critical to ensuring the safety of automotive passengers and pedestrians under the ASIL standards. Thus, as non-limiting examples, the safety-critical block circuits 104(0)-104(S) may comprise circuits responsible for managing braking, steering, airbag control, and the like.

Some aspects of the processor device 102 may further provide a safety manager circuit 106 that is configured to act as a central control unit to ensure fault detection and handling, provide safety monitoring and diagnostics, and trigger safety mechanisms if necessary. The processor device 102 according to some aspects may also provide a TME circuit 108 that is configured to perform a secure boot process for the processor device 102 by, e.g., verifying the authenticity of and securely loading a bootloader (not shown) and firmware (not shown). The TME circuit 108 thus ensures that only trusted and verified code is loaded and executed by the processor device 102 at startup, thereby protecting the processor-based device 100 from malicious attacks and unauthorized modifications.

As noted above, compliance with the ASIL standards requires the processor device 102 to implement safety mechanisms and redundancy strategies to detect and mitigate faults. However, conventional safety and redundancy mechanisms such as dual-core lockstep techniques, triple module redundancy techniques, and end-to-end monitoring (E2M) techniques may suffer from disadvantages. For example, dual core lockstep and triple module redundancy may not be able to be implemented for all of the safety-critical block circuits 104(0)-104(S) of FIG. 1 due to the excessive processor area required. Moreover, E2M safety mechanisms may be time-consuming, may not be continuously active, and/or may incur additional software processing overhead. For instance, E2M mechanisms like Software Test Libraries (STL) incur software overhead and may not report a fault detection immediately as they are time-bound.

In this regard, the processor device 102 is configured to provide adaptive and dynamic redundancy for functional safety. As seen in FIG. 1, the processor device 102 provides a plurality of CRLB clusters 110(0)-110(C) that each comprise a plurality of CRLB circuits 112(0)-112(X), 114(0)-114(X), 116(0)-116(X). Each of the CRLB circuits 112(0)-112(X), 114(0)-114(X), 116(0)-116(X) comprises a circuit that can be configured to mimic the functionality of a primitive gate and/or a primitive flipflop, and that can be configurable interconnected with other CRLB circuits 112(0)-112(X), 114(0)-114(X), 116(0)-116(X) to form the corresponding CRLB clusters 110(0)-110(C). Thus, each of the CRLB clusters 110(0)-110(C) can be configured to reproduce the functionality of any one of the safety-critical block circuits 104(0)-104(S).

Note that, in the example of FIG. 1, the number C+1 of the CRLB clusters 110(0)-110(C) is less than the number S+1 of the safety-critical block circuits 104(0)-104(S). The number of CRLB clusters 110(0)-110(C) is determined at design time to ensure redundancy for the maximum number of the safety-critical block circuits 104(0)-104(S) that may be active at any given time. Consider an example scenario in which there are five (5) safety-critical block circuits 104(0)-104(4), with a maximum of three (3) of the safety-critical block circuits 104(0)-104(4) active at any given time. In this scenario, only three (3) CRLB clusters 110(0)-110(2) would be needed to ensure redundancy for the safety-critical block circuits 104(0)-104(4). This provides area savings compared to duplicating all five (5) of the safety-critical block circuits 104(0)-104(4), as the three (3) CRLB clusters 110(0)-110(2) can be dynamically mapped to mimic the logic and functionality of whichever three (3) of the safety-critical block circuits 104(0)-104(4) are active at a given time.

The processor device also comprises a central CRLB controller circuit 118 and a redundancy map matrix switch circuit 120 that is communicatively coupled to the safety-critical block circuits 104(0)-104(S), the CRLB clusters 110(0)-110(C), and the central CRLB controller circuit 118. In exemplary operation, the central CRLB controller circuit 118 receives redundancy mapping data 122 for each safety-critical block circuit of the plurality of safety-critical block circuits 104(0)-104(S) of the processor device 102. The redundancy mapping data 122 comprises all information needed to configure a CRLB cluster of the plurality of CRLB clusters 110(0)-110(C) to reproduce the functionality of a safety-critical block circuit of the plurality of safety-critical block circuits 104(0)-104(S). The redundancy mapping data 122 may be compiled at a design time of the processor-based device 100 (i.e., generated as part of an offline process), and in some aspects may be stored in a flash memory device 124 of the processor device 102. Some such aspects may further provide that the central CRLB controller circuit 118 receives the redundancy mapping data 122 from the TME circuit 108 as part of a TME secure boot process performed by the TME circuit 108 at startup of the processor device 102. Upon receiving the redundancy mapping data 122, the central CRLB controller circuit 118 in some aspects may store the redundancy mapping data 122 in a CRLB cluster RAM device 126 of the processor device 102 for later access.

According to some aspects, the safety manager circuit 106 of the processor device 102 may determine a current use case 128 of the processor device 102. The current use case 128 may comprise, e.g., a currently executing application (not shown) and/or current operating conditions (not shown) for the processor device 102. In some such aspects, the safety manager circuit 106 determines the current use case 128 in response to detecting a change from a prior use case 130 of the processor device 102 (e.g., a change to the currently executing application from a previously executing application and/or a change to the current operating conditions from previous operating conditions). Based on the current use case 128, the safety manager circuit 106 in such aspects identifies one or more of the safety-critical block circuits 104(0)-104(S) as active block circuits (i.e., a subset of the safety-critical block circuits 104(0)-104(S) that are expected to be operational in the current use case 128). It is assumed in the example of FIG. 1 that the safety manager circuit 106 identifies the safety-critical block circuits 104 (0)-104(2) as active block circuits 104(0)-104(2) in the current use case 128. The safety manager circuit 106 then transmits an indication 132 of the one or more active block circuits 104(0)-104(2) to the central CRLB controller circuit 118.

The central CRLB controller circuit 118 receives the indication 132 of the one or more active block circuits 104(0)-104(2) among the plurality of safety-critical block circuits 104(0)-104(S). The central CRLB controller circuit 118 transmits the redundancy mapping data 122 corresponding to the one or more active block circuits 104(0)-104(2) to the redundancy map matrix switch circuit 120. The redundancy map matrix switch circuit 120 then maps the one or more active block circuits 104(0)-104(2) to a corresponding one or more CRLB clusters 110(0)-110(C), and configures the one or more CRLB clusters 110(0)-110(C) to duplicate functionality of the respective one or more active block circuits 104(0)-104(2), based on the redundancy mapping data 122. The redundancy map matrix switch circuit 120 may configure the one or more CRLB clusters 110(0)-110 (C) by programming the CRLB clusters 110(0)-110(C), or feeding the redundancy mapping data 122 to the CRLB clusters 110(0)-110(C), by means of a shift-registers-based mechanism, which ensures that the correct functionality is mapped to the appropriate respective CRLB clusters 110(0)-110(C). In the example of FIG. 1, for instance, the redundancy map matrix switch circuit 120 configures the CRLB cluster 110(0) to duplicate functionality of the active block circuit 104(0), configures the CRLB cluster 110(1) to duplicate functionality of the active block circuit 104(1), and configures the CRLB cluster 110(C) to duplicate functionality of the active block circuit 104(2).

The redundancy map matrix switch circuit 120 then provides logic redundancy for the one or more active block circuits 104(0)-104(2) using the one or more CRLB clusters 110(0)-110(C). This may entail, for example, providing input data (not shown) sent to respective ones of the active block circuits 104(0)-104(2) to corresponding ones of the CRLB clusters 110(0)-110(C). The redundancy map matrix switch circuit 120 in some aspects may be configured to compare a first output 134 of, e.g., the active block circuit 104(0), with a second output 136 of the corresponding CRLB cluster 110(0), and determine whether the first output 134 matches the second output 136. If not, the redundancy map matrix switch circuit 120 is configured to transmit a fault indication 138 for the active block circuit 104(0) to the safety manager circuit 106. Some such aspects may further provide that the redundancy map matrix switch circuit 120 is further configured to perform fault correction by using the functionality of the CRLB cluster 110(0) in place of the active block circuit 104(0). Thus, for example, future inputs to the active block circuit 104(0) may be redirected by the redundancy map matrix switch circuit 120 to the CRLB cluster 110(0), and output from the CRLB cluster 110(0) may be substituted for output from the active block circuit 104(0).

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 and/or the processor device 102 may include elements in addition to those illustrated in FIG. 1, and/or may include more or fewer of the elements illustrated in FIG. 1. For example, the processor-based device 100 may further include caches, controllers, communications buses, and/or persistent storage devices, which are omitted from FIG. 1 for the sake of clarity. Moreover, it is to be further understood that some exemplary elements illustrated in FIG. 1 as integral elements of the processor device 102 may be implemented as elements external to the processor device 102 in some aspects. For instance, the CRLB cluster RAM device 126 and/or the flash memory device 124 may comprise hardware elements external to the processor device 102 according to some aspects.

Figure 2A:
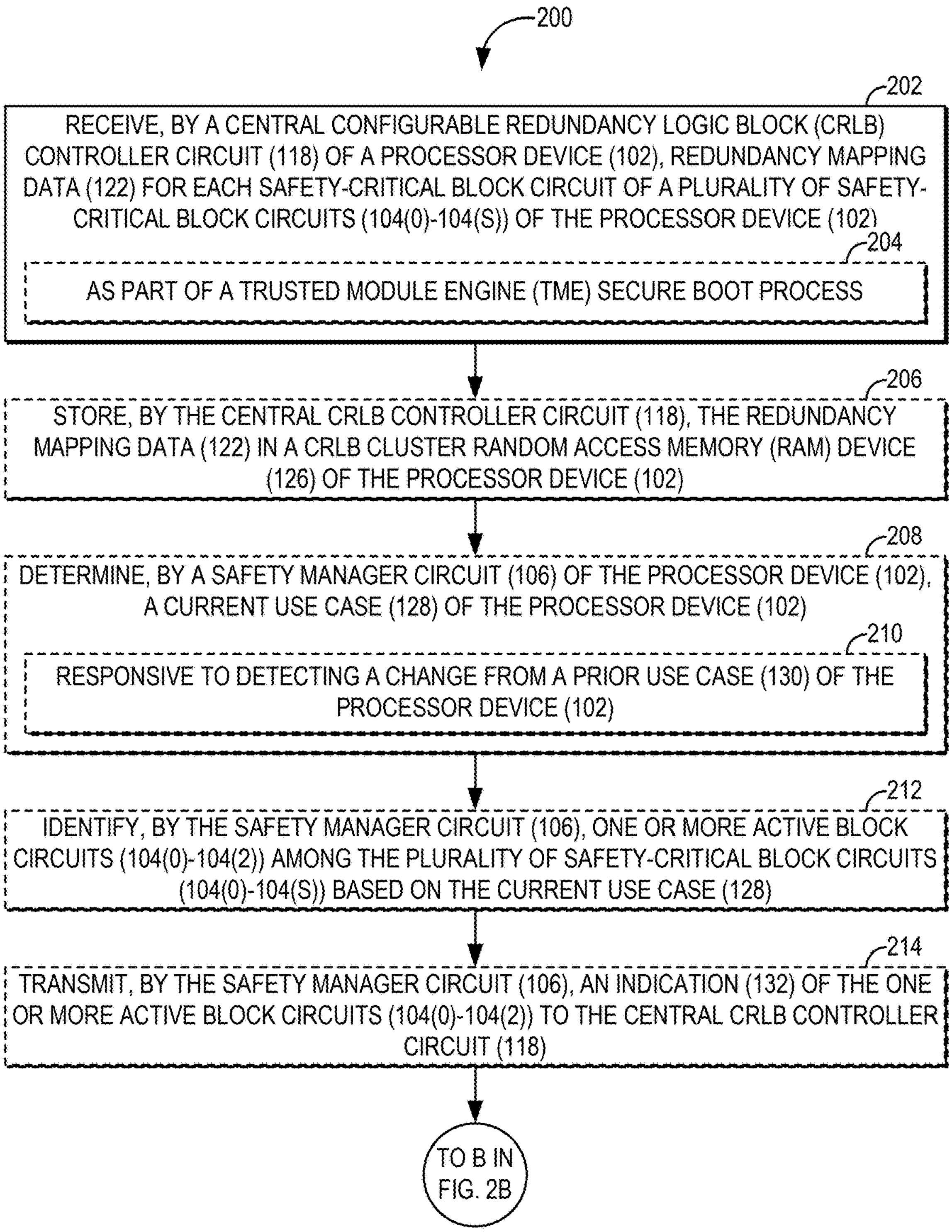
FIGS. 2A-2C are flowcharts illustrating exemplary operations performed by the processor device of FIG. 1 for providing adaptive and dynamic redundancy for functional safety, according to some aspects.
Figure 2B:
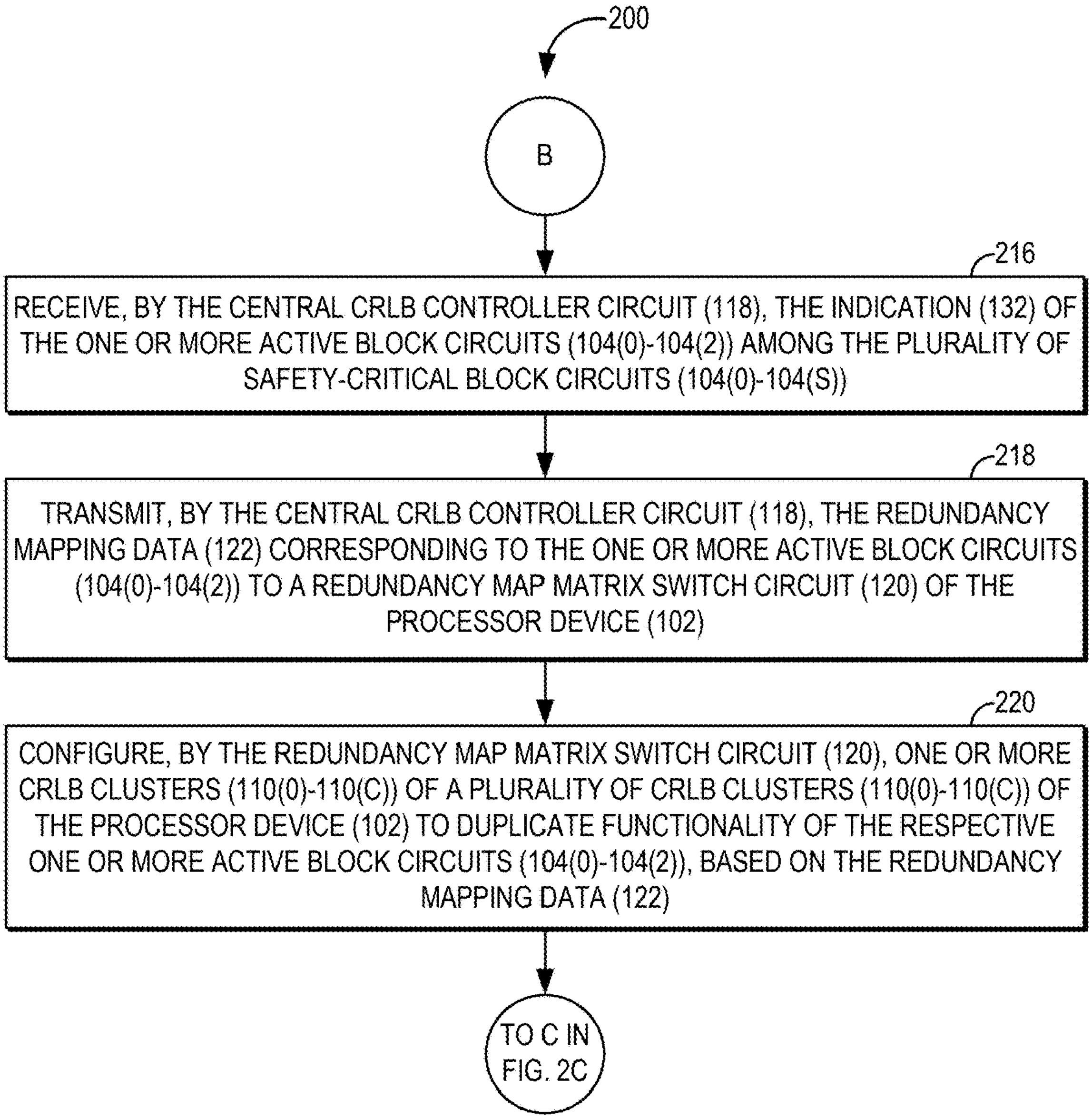
Figure 2C:
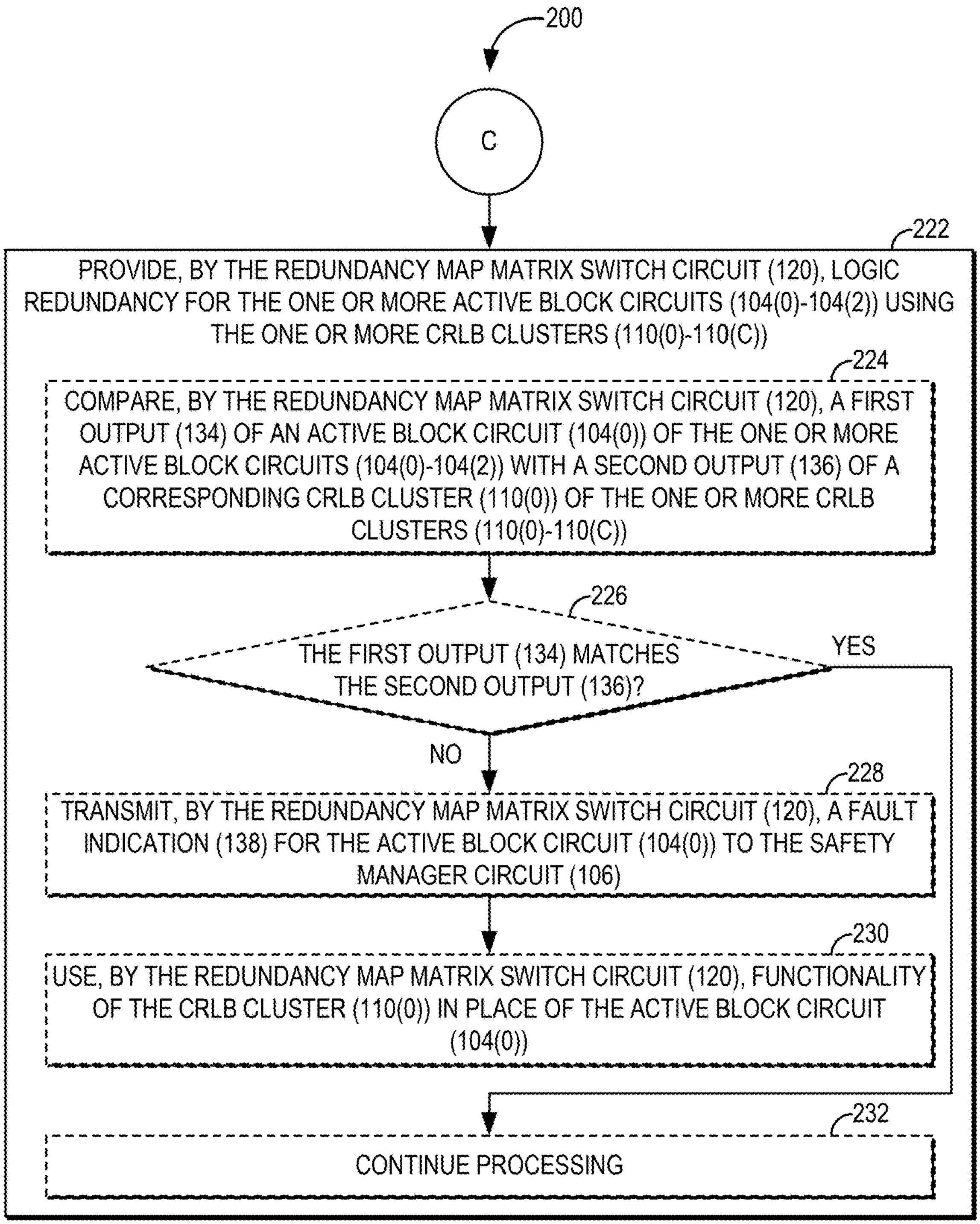

To illustrate operations performed by the processor device 102 of FIG. 1 for providing adaptive and dynamic redundancy for functional safety according to some aspects, FIGS. 2A-2C provide a flowchart showing exemplary operations 200. For the sake of clarity, elements of FIG. 1 are referenced in describing FIGS. 2A-2C. It is to be understood that some aspects may provide that some operations illustrated in FIGS. 2A-2C may be performed in an order other than that illustrated herein, and/or may be omitted.

The exemplary operations 200 begin in FIG. 2A with a CRLB controller circuit (e.g., the central CRLB controller circuit 118 of FIG. 1) of a processor device (such as the processor device 102 of FIG. 1) receiving redundancy mapping data (e.g., the redundancy mapping data 122 of FIG. 1) for each safety-critical block circuit of a plurality of safety-critical block circuits (such as the safety-critical block circuits 104(0)-104(S) of FIG. 1) of the processor device 102 (block 202). In some aspects, the operations of block 202 for receiving the redundancy mapping data 122 may comprise the central CRLB controller circuit 118 receiving the redundancy mapping data 122 as part of a TME secure boot process (block 204). Some aspects may provide that the central CRLB controller circuit 118 stores the redundancy mapping data 122 in a CRLB cluster RAM device (e.g., the CRLB cluster RAM device 126 of FIG. 1) of the processor device 102 (block 206).

According to some aspects, a safety manager circuit (such as the safety manager circuit 106 of FIG. 1) of the processor device 102 determines a current use case (e.g., the current use case 128 of FIG. 1) of the processor device 102 (block 208). In some aspects, the operations of block 208 for determining the current use case 128 may be performed responsive to the safety manager circuit 106 detecting a change from a prior use case (such as the prior use case 130 of FIG. 1) of the processor device 102 (block 210). The safety manager circuit 106 identifies one or more active block circuits (such as the safety-critical block circuits 104(0)-104(2) of FIG. 1) among the plurality of safety-critical block circuits 104(0)-104(S) based on the current use case 128 (block 212). The safety manager circuit 106 then transmits an indication (e.g., the indication 132 of FIG. 1) of the one or more active block circuits 104(0)-104(2) to the central CRLB controller circuit 118 (block 214). The exemplary operations 200 continue at block 216 of FIG. 2B.

Turning now to FIG. 2B, the central CRLB controller circuit 118 receives the indication 132 of the one or more active block circuits 104(0)-104(2) among the plurality of safety-critical block circuits 104(0)-104(S) (block 216). The central CRLB controller circuit 118 transmits the redundancy mapping data 122 corresponding to the one or more active block circuits 104(0)-104(2) to a redundancy map matrix switch circuit (such as the redundancy map matrix switch circuit 120 of FIG. 1) of the processor device 102 (block 218). The redundancy map matrix switch circuit 120 configures one or more CRLB clusters (e.g., the CRLB clusters 110(0)-110(C) of FIG. 1) of a plurality of CRLB clusters (such as the CRLB clusters 110(0)-110(C) of FIG. 1) of the processor device 102 to duplicate functionality of the respective one or more active block circuits 104(0)-104(2), based on the redundancy mapping data 122 (block 220). The exemplary operations 200 continue at block 222 of FIG. 2C.

Referring now to FIG. 2C, the redundancy map matrix switch circuit 120 then provides logic redundancy for the one or more active block circuits 104(0)-104(2) using the one or more CRLB clusters 110(0)-110(C) (block 222). Some aspects may provide that the operations of block 222 for providing logic redundancy for the one or more active block circuits 104(0)-104(2) using the one or more CRLB clusters 110(0)-110(C) may comprise the redundancy map matrix switch circuit 120 comparing a first output (such as the first output 134 of FIG. 1) of an active block circuit (e.g., the active block circuit 104(0) of FIG. 1) of the one or more active block circuits 104(0)-104(2) with a second output (such as the second output 136 of FIG. 1) of a corresponding CRLB cluster (e.g., the CRLB cluster 110(0) of FIG. 1) of the one or more CRLB clusters 110(0)-110(C) (block 224). The redundancy map matrix switch circuit 120 then determines whether the first output 134 matches the second output 136 (block 226). If not, the redundancy map matrix switch circuit 120 transmits a fault indication (such as the fault indication 138 of FIG. 1) for the active block circuit 104(0) to the safety manager circuit 106 (block 228). In some aspects, the redundancy map matrix switch circuit 120 may use functionality of the CRLB cluster 110(0) in place of the active block circuit 104(0) (block 230). If the redundancy map matrix switch circuit 120 determines at decision block 226 that the first output 134 matches the second output 136, processing continues in conventional fashion (block 232).

The processor device according to aspects disclosed herein and discussed with reference to FIG. 1 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 3:
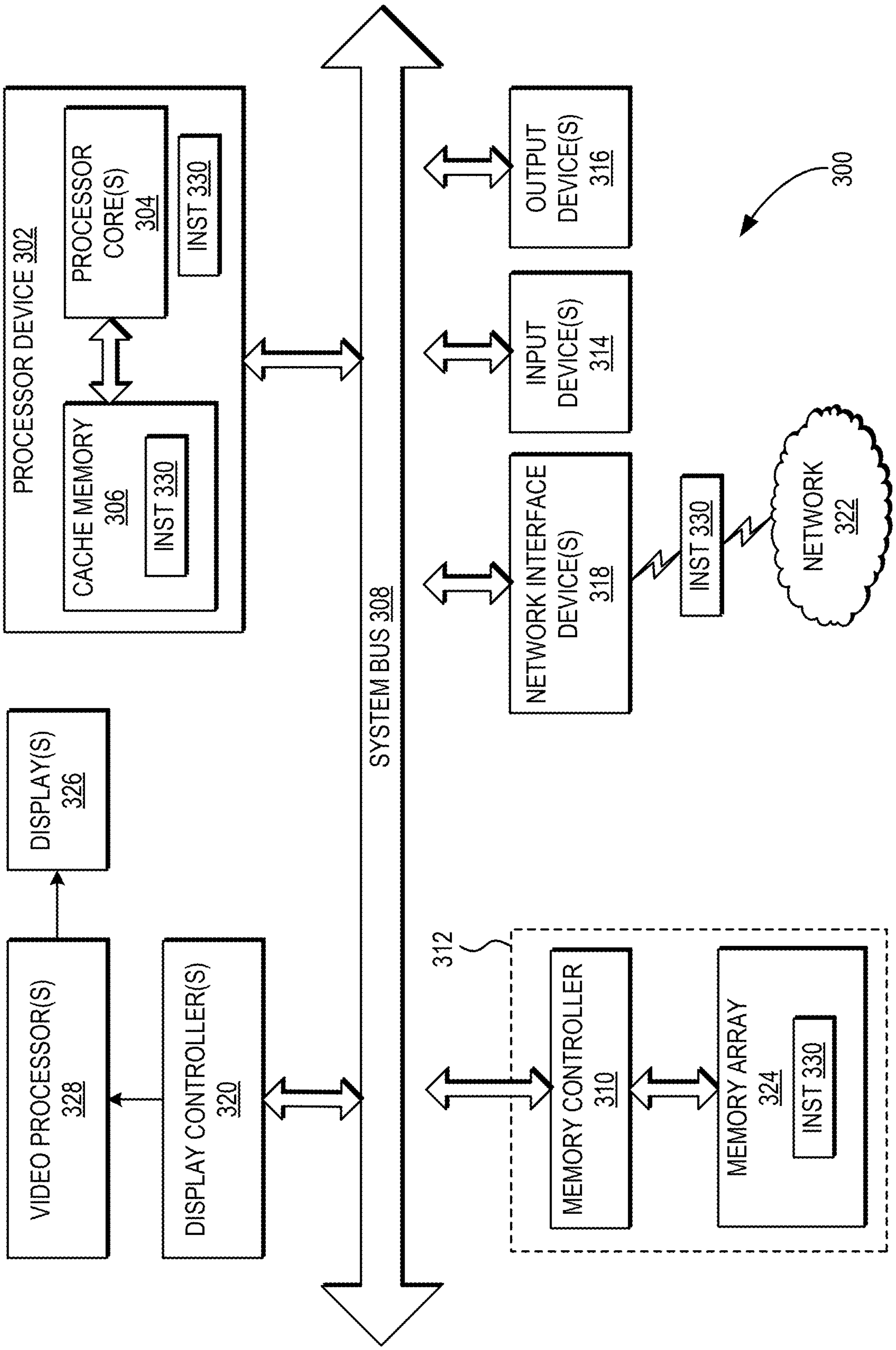
FIG. 3 is a block diagram of an exemplary processor-based device that can include the processor device of FIG. 1.

In this regard, FIG. 3 illustrates an example of a processor-based device 300, which corresponds in functionality to the processor-based device 100 of FIG. 1. In this example, the processor-based device 300 includes a processor device 302 (corresponding to the processor device 102 of FIG. 1) that comprises one or more processor cores 304 coupled to a cache memory 306. The processor device 302 is also coupled to a system bus 308 and can intercouple devices included in the processor-based device 300. As is well known, the processor device 302 communicates with these other devices by exchanging address, control, and data information over the system bus 308. For example, the processor device 302 can communicate bus transaction requests to a memory controller 310. Although not illustrated in FIG. 3, multiple system buses 308 could be provided, wherein each system bus 308 constitutes a different fabric.

Other devices may be connected to the system bus 308. As illustrated in FIG. 3, these devices can include a memory system 312, one or more input devices 314, one or more output devices 316, one or more network interface devices 318, and one or more display controllers 320, as examples. The input device(s) 314 can include any type of input device, including, but not limited to, input keys, switches, voice processors, etc. The output device(s) 316 can include any type of output device, including, but not limited to, audio, video, other visual indicators, etc. The network interface device(s) 318 can be any devices configured to allow exchange of data to and from a network 322. The network 322 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 318 can be configured to support any type of communications protocol desired. The memory system 312 can include the memory controller 310 coupled to one or more memory arrays 324.

The processor device 302 may also be configured to access the display controller(s) 320 over the system bus 308 to control information sent to one or more displays 326. The display controller(s) 320 sends information to the display(s) 326 to be displayed via one or more video processors 328, which process the information to be displayed into a format suitable for the display(s) 326. The display(s) 326 can include any type of display, including, but not limited to, a cathode ray tube (CRT), a liquid crystal display (LCD), a plasma display, a light emitting diode (LED) display, etc.

The processor-based device 300 in FIG. 3 may include a set of instructions (captioned as "INST" in FIG. 3) 330 that may be executed by the processor device 302 for any application desired according to the instructions. The instructions 330 may be stored in the memory system 312, the processor device 302, and/or the cache memory 306, each of which may comprise an example of a non-transitory computer-readable medium. The instructions 330 may also reside, completely or at least partially, within the memory system 312 and/or within the processor device 302 during their execution. The instructions 330 may further be transmitted or received over the network 322, such that the network 322 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 330. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:

a plurality of safety-critical block circuits;

a plurality of configurable redundancy logic block (CRLB) clusters, each comprising a plurality of CRLB circuits;

a central CRLB controller circuit; and a redundancy map matrix switch circuit communicatively coupled to the plurality of safety-critical block circuits, the plurality of CRLB clusters, and the central CRLB controller circuit;

the central CRLB controller circuit configured to:

receive redundancy mapping data for each safety-critical block circuit of the plurality of safety-critical block circuits;

receive an indication of one or more active block circuits among the plurality of safety-critical block circuits; and transmit the redundancy mapping data corresponding to the one or more active block circuits to the redundancy map matrix switch circuit;

the redundancy map matrix switch circuit configured to:

configure one or more CRLB clusters of the plurality of CRLB clusters to duplicate functionality of the respective one or more active block circuits, based on the redundancy mapping data; and provide logic redundancy for the one or more active block circuits using the one or more CRLB clusters.

2. The processor device of clause 1, further comprising a CRLB cluster Random Access Memory (RAM) device;

wherein the central CRLB controller circuit is further configured to:

receive the redundancy mapping data as part of a trusted module engine (TME) secure boot process; and store the redundancy mapping data in the CRLB cluster RAM device.

3. The processor device of any one of clauses 1-2, further comprising a safety manager circuit configured to:

determine a current use case of the processor device;

identify the one or more active block circuits based on the current use case; and transmit the indication of the one or more active block circuits to the central CRLB controller circuit.

4. The processor device of clause 3, wherein the safety manager circuit is configured to determine the current use case of the processor device responsive to detecting a change from a prior use case of the processor device.

5. The processor device of any one of clauses 3-4, wherein the redundancy map matrix switch circuit is configured to provide logic redundancy for the one or more active block circuits using the one or more CRLB clusters by being configured to:

compare a first output of an active block circuit of the one or more active block circuits with a second output of a corresponding CRLB cluster of the one or more CRLB clusters;

determine whether the first output matches the second output; and responsive to determining that the first output does not match the second output, transmit a fault indication for the active block circuit to the safety manager circuit.

6. The processor device of clause 5, wherein the redundancy map matrix switch circuit is further configured to, further responsive to determining that the first output does not match the second output, use functionality of the CRLB cluster in place of the active block circuit.

7. The processor device of any one of clauses 1-6, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

8. A processor device, comprising:

means for receiving redundancy mapping data for each safety-critical block circuit of a plurality of safety-critical block circuits of the processor device;

means for receiving an indication of one or more active block circuits among the plurality of safety-critical block circuits;

means for configuring one or more configurable redundancy logic block (CRLB) clusters of a plurality of CRLB clusters to duplicate functionality of the respective one or more active block circuits, based on the redundancy mapping data corresponding to the one or more active block circuits; and means for executing the one or more active block circuits with the one or more CRLB clusters as redundancy.

9. A method for providing adaptive and dynamic redundancy for functional safety, comprising:

receiving, by a central configurable redundancy logic block (CRLB) controller circuit of a processor device, redundancy mapping data for each safety-critical block circuit of a plurality of safety-critical block circuits of the processor device;

receiving, by the central CRLB controller circuit, an indication of one or more active block circuits among the plurality of safety-critical block circuits;

transmitting, by the central CRLB controller circuit, the redundancy mapping data corresponding to the one or more active block circuits to a redundancy map matrix switch circuit of the processor device;

configuring, by the redundancy map matrix switch circuit, one or more CRLB clusters of a plurality of CRLB clusters of the processor device to duplicate functionality of the respective one or more active block circuits, based on the redundancy mapping data; and providing, by the redundancy map matrix switch circuit, logic redundancy for the one or more active block circuits using the one or more CRLB clusters.

10. The method of clause 9, further comprising:

receiving, by the central CRLB controller circuit, the redundancy mapping data as part of a trusted module engine (TME) secure boot process; and storing, by the central CRLB controller circuit, the redundancy mapping data in a CRLB cluster Random Access Memory (RAM) device of the processor device.

11. The method of any one of clauses 9-10, further comprising:

determining, by a safety manager circuit of the processor device, a current use case of the processor device;

identifying, by the safety manager circuit, the one or more active block circuits based on the current use case; and transmitting, by the safety manager circuit, the indication of the one or more active block circuits to the central CRLB controller circuit.

12. The method of clause 11, wherein determining the current use case of the processor device is responsive to detecting a change from a prior use case of the processor device.

13. The method of any one of clauses 11-12, wherein providing logic redundancy for the one or more active block circuits using the one or more CRLB clusters comprises:

comparing, by the redundancy map matrix switch circuit, a first output of an active block circuit of the one or more active block circuits with a second output of a corresponding CRLB cluster of the one or more CRLB clusters;

determining, by the redundancy map matrix switch circuit, that the first output does not match the second output; and responsive to determining that the first output does not match the second output, transmitting, by the redundancy map matrix switch circuit, a fault indication for the active block circuit to the safety manager circuit.

14. The method of clause 13, further comprising, further responsive to determining that the first output does not match the second output, using, by the redundancy map matrix switch circuit, functionality of the CRLB cluster in place of the active block circuit.

15. A non-transitory computer-readable medium, having stored thereon computer-executable instructions that, when executed by a processor device, causes the processor device to:

receive redundancy mapping data for each safety-critical block circuit of a plurality of safety-critical block circuits of the processor device;

receive an indication of one or more active block circuits among the plurality of safety-critical block circuits;

transmit the redundancy mapping data corresponding to the one or more active block circuits to a redundancy map matrix switch circuit of the processor device;

configure one or more configurable redundancy logic block (CRLB) clusters of a plurality of CRLB clusters of the processor device to duplicate functionality of the respective one or more active block circuits, based on the redundancy mapping data; and provide logic redundancy for the one or more active block circuits using the one or more CRLB clusters.

16. The non-transitory computer-readable medium of clause 15, wherein the computer-executable instructions further cause the processor device to:

receive the redundancy mapping data as part of a trusted module engine (TME) secure boot process; and store the redundancy mapping data in a CRLB cluster Random Access Memory (RAM) device of the processor device.

17. The non-transitory computer-readable medium of any one of clauses 15-16, wherein the computer-executable instructions further cause the processor device to:

determine a current use case of the processor device;

identify the one or more active block circuits based on the current use case; and transmit the indication of the one or more active block circuits to a central CRLB controller circuit of the processor device.

18. The non-transitory computer-readable medium of clause 17, wherein the computer-executable instructions cause the processor device to determine the current use case of the processor device responsive to detecting a change from a prior use case of the processor device.

19. The non-transitory computer-readable medium of any one of clauses 17-18, wherein the computer-executable instructions cause the processor device to provide logic redundancy for the one or more active block circuits using the one or more CRLB clusters by causing the processor device to:

compare a first output of an active block circuit of the one or more active block circuits with a second output of a corresponding CRLB cluster of the one or more CRLB clusters;

determine whether the first output matches the second output; and responsive to determining that the first output does not match the second output, transmit a fault indication for the active block circuit to a safety manager circuit of the processor device.

20. The non-transitory computer-readable medium of clause 19, wherein the computer-executable instructions further cause the processor device to, further responsive to determining that the first output does not match the second output, use functionality of the CRLB cluster in place of the active block circuit.

What is claimed is:

1. A processor device, comprising:

a plurality of statically configured safety-critical block circuits;

a plurality of configurable redundancy logic block (CRLB) clusters, each comprising a plurality of CRLB circuits, wherein a count of the plurality of CRLB circuits is less than a count of the plurality of safety-critical block circuits;

a central CRLB controller circuit; and a redundancy map matrix switch circuit communicatively coupled to the plurality of safety-critical block circuits, the plurality of CRLB clusters, and the central CRLB controller circuit;

the central CRLB controller circuit configured to:

receive redundancy mapping data for each safety-critical block circuit of the plurality of safety-critical block circuits;

receive an indication of one or more active block circuits among the plurality of safety-critical block circuits; and responsive to the receipt of the indication, transmit the redundancy mapping data corresponding to the one or more active block circuits to the redundancy map matrix switch circuit; and the redundancy map matrix switch circuit configured to:

configure one or more CRLB clusters of the plurality of CRLB clusters to duplicate functionality of the respective one or more active block circuits, based on the redundancy mapping data; and provide logic redundancy for the one or more active block circuits using the one or more CRLB clusters.

2. The processor device of claim 1, further comprising a CRLB cluster Random Access Memory (RAM) device;

wherein the central CRLB controller circuit is further configured to:

receive the redundancy mapping data as part of a trusted module engine (TME) secure boot process; and store the redundancy mapping data in the CRLB cluster RAM device.

3. The processor device of claim 1, further comprising a safety manager circuit configured to:

determine a current use case of the processor device;

identify the one or more active block circuits based on the current use case; and transmit the indication of the one or more active block circuits to the central CRLB controller circuit.

4. The processor device of claim 3, wherein the safety manager circuit is configured to determine the current use case of the processor device responsive to detecting a change from a prior use case of the processor device.

5. The processor device of claim 3, wherein the redundancy map matrix switch circuit is configured to provide logic redundancy for the one or more active block circuits using the one or more CRLB clusters by being configured to:

compare a first output of an active block circuit of the one or more active block circuits with a second output of a corresponding CRLB cluster of the one or more CRLB clusters;

determine whether the first output matches the second output; and responsive to determining that the first output does not match the second output, transmit a fault indication for the active block circuit to the safety manager circuit.

6. The processor device of claim 5, wherein the redundancy map matrix switch circuit is further configured to, further responsive to determining that the first output does not match the second output, use functionality of the CRLB cluster in place of the active block circuit.

7. The processor device of claim 1, integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

8. A processor device, comprising:

means for receiving redundancy mapping data for each safety-critical block circuit of a plurality of statically configured safety-critical block circuits of the processor device;

means for receiving an indication of one or more active block circuits among the plurality of safety-critical block circuits;

means for configuring one or more configurable redundancy logic block (CRLB) clusters of a plurality of CRLB clusters to duplicate functionality of the respective one or more active block circuits, based on the redundancy mapping data corresponding to the one or more active block circuits, wherein a count of the plurality of CRLB circuits is less than a count of the plurality of safety-critical block circuits; and means for executing the one or more active block circuits with the one or more CRLB clusters as redundancy.

9. A method for providing adaptive and dynamic redundancy for functional safety, comprising:

receiving, by a central configurable redundancy logic block (CRLB) controller circuit of a processor device, redundancy mapping data for each safety-critical block circuit of a plurality of statically configured safety-critical block circuits of the processor device;

receiving, by the central CRLB controller circuit, an indication of one or more active block circuits among the plurality of safety-critical block circuits;

responsive to the receipt of the indication, transmitting, by the central CRLB controller circuit, the redundancy mapping data corresponding to the one or more active block circuits to a redundancy map matrix switch circuit of the processor device;

configuring, by the redundancy map matrix switch circuit, one or more CRLB clusters of a plurality of CRLB clusters of the processor device to duplicate functionality of the respective one or more active block circuits, based on the redundancy mapping data, wherein a count of the plurality of CRLB circuits is less than a count of the plurality of safety-critical block circuits; and providing, by the redundancy map matrix switch circuit, logic redundancy for the one or more active block circuits using the one or more CRLB clusters.

10. The method of claim 9, further comprising:

receiving, by the central CRLB controller circuit, the redundancy mapping data as part of a trusted module engine (TME) secure boot process; and storing, by the central CRLB controller circuit, the redundancy mapping data in a CRLB cluster Random Access Memory (RAM) device of the processor device.

11. The method of claim 9, further comprising:

determining, by a safety manager circuit of the processor device, a current use case of the processor device;

identifying, by the safety manager circuit, the one or more active block circuits based on the current use case; and transmitting, by the safety manager circuit, the indication of the one or more active block circuits to the central CRLB controller circuit.

12. The method of claim 11, wherein determining the current use case of the processor device is responsive to detecting a change from a prior use case of the processor device.

13. The method of claim 11, wherein providing logic redundancy for the one or more active block circuits using the one or more CRLB clusters comprises:

comparing, by the redundancy map matrix switch circuit, a first output of an active block circuit of the one or more active block circuits with a second output of a corresponding CRLB cluster of the one or more CRLB clusters;

determining, by the redundancy map matrix switch circuit, that the first output does not match the second output; and responsive to determining that the first output does not match the second output, transmitting, by the redundancy map matrix switch circuit, a fault indication for the active block circuit to the safety manager circuit.

14. The method of claim 13, further comprising, further responsive to determining that the first output does not match the second output, using, by the redundancy map matrix switch circuit, functionality of the CRLB cluster in place of the active block circuit.

15. A non-transitory computer-readable medium, having stored thereon computer-executable instructions that, when executed by a processor device, causes the processor device to:

receive redundancy mapping data for each safety-critical block circuit of a plurality of statically configured safety-critical block circuits of the processor device;

receive an indication of one or more active block circuits among the plurality of safety-critical block circuits;

responsive to the receipt of the indication, transmit the redundancy mapping data corresponding to the one or more active block circuits to a redundancy map matrix switch circuit of the processor device;

configure one or more configurable redundancy logic block (CRLB) clusters of a plurality of CRLB clusters of the processor device to duplicate functionality of the respective one or more active block circuits, based on the redundancy mapping data, wherein a count of the plurality of CRLB circuits is less than a count of the plurality of safety-critical block circuits; and provide logic redundancy for the one or more active block circuits using the one or more CRLB clusters.

16. The non-transitory computer-readable medium of claim 15, wherein the computer-executable instructions further cause the processor device to:

receive the redundancy mapping data as part of a trusted module engine (TME) secure boot process; and store the redundancy mapping data in a CRLB cluster Random Access Memory (RAM) device of the processor device.

17. The non-transitory computer-readable medium of claim 15, wherein the computer-executable instructions further cause the processor device to:

determine a current use case of the processor device;

identify the one or more active block circuits based on the current use case; and transmit the indication of the one or more active block circuits to a central CRLB controller circuit of the processor device.

18. The non-transitory computer-readable medium of claim 17, wherein the computer-executable instructions cause the processor device to determine the current use case of the processor device responsive to detecting a change from a prior use case of the processor device.

19. The non-transitory computer-readable medium of claim 17, wherein the computer-executable instructions cause the processor device to provide logic redundancy for the one or more active block circuits using the one or more CRLB clusters by causing the processor device to:

compare a first output of an active block circuit of the one or more active block circuits with a second output of a corresponding CRLB cluster of the one or more CRLB clusters;

determine whether the first output matches the second output; and responsive to determining that the first output does not match the second output, transmit a fault indication for the active block circuit to a safety manager circuit of the processor device.

20. The non-transitory computer-readable medium of claim 19, wherein the computer-executable instructions further cause the processor device to, further responsive to determining that the first output does not match the second output, use functionality of the CRLB cluster in place of the active block circuit.

* * * * *